United States Patent [19]
Romansky

[11] Patent Number: 5,064,251
[45] Date of Patent: Nov. 12, 1991

[54] ELECTROPNEUMATIC AIR BRAKE CONTROL SYSTEM FOR RAILWAY VEHICLES

[75] Inventor: Michael E. Romansky, North Huntingdon, Pa.

[73] Assignee: Westinghouse Air Brake Company, Wilmerding, Pa.

[21] Appl. No.: 502,949

[22] Filed: Apr. 2, 1990

[51] Int. Cl.⁵ .............................................. B60T 13/70
[52] U.S. Cl. ......................................... 303/3; 303/15; 303/20; 303/33
[58] Field of Search ............................ 303/20, 28–47, 303/50, 52, 3, 15, 16, 17

[56] References Cited

U.S. PATENT DOCUMENTS

| | | | |
|---|---|---|---|
| 4,364,610 | 12/1982 | Williams | 303/20 |
| 4,598,953 | 7/1986 | Wood et al. | 303/20 |
| 4,859,000 | 8/1989 | Deno et al. | 303/20 |
| 4,971,399 | 11/1990 | Balukin et al. | 303/20 |

Primary Examiner—Mathew C. Graham
Attorney, Agent, or Firm—G. J. Falce

[57] ABSTRACT

An electromagnetic air brake control system including a module portion and an integral relay valve portion. The module portion includes a brake pipe cut-off valve. A bistable electropneumatic valve device pneumatically connected to the brake pipe cut-off valve. A pole changing relay electrically connected to an electric coil of the bistable electromagnetic device. The pole changing relay having an electric coil connected to a d.c. voltage. A quick release relay having an electric connection to the d.c. voltage and having contacts connectable to contacts of the pole changing relay. A pair of relay driver circuits supplied by a supplemental power supply for causing the electric coils of the pole changing and quick release relays to be energized and deenergized in accordance with output signals received from a command control circuit and a monitor checking circuit.

20 Claims, 2 Drawing Sheets

ELECTROPNEUMATIC AIR BRAKE CONTROL SYSTEM FOR RAILWAY VEHICLES

BACKGROUND OF THE INVENTION

This invention relates to an air brake control system for railway vehicles and more particular to an electropneumatic air brake control system for manually actuating electronic circuits to electrically activate electromagnetic relays for operating an electropneumatic valve to pneumatically control the fluid pressure in a remotely located brake pipe cut-off valve of railway vehicle brake equipment.

FIELD OF THE INVENTION

Previously, the "26" type of locomotive brake equipment employed a manually operated valve which pneumatically piloted the brake pipe cut-off valve. Both the manually operated valve and the brake pipe cut-off valve were located in the brake valve body which was situated at the control station in the cab of the locomotive. However, in the "30" type of locomotive brake equipment, the brake pipe cut-off valve, the emergency valve, the vent valve, and the check valves for developing 30-A pipe pressure of a 30-CW module portion are combined with the C-2-W relay valve portion to control the brake pipe pressure in accordance with the pressure of the equalizing reservoir on a lead locomotive in substantially the same way as the 26 type of brake equipment. Conversely, on a trail or dead locomotive, the brake pipe cut-off valve disables the relay valve so that the admission of air under pressure to, and the exhaust of such from the brake pipe, is prevented or nullified. In the prior art brake equipment, the requested operation and the desired functions were pneumatically controlled and executed for initiating air brake applications and releases on locomotives. It will be appreciated that such previous prevalent pneumatic brake systems require extensive piping between the remotely located equipment and the control station in the cab of the locomotive. While such foregoing air brake systems functioned and operated satisfactorily, they were expensive to install and were costly to maintain and service. There is always a need for new and improved air brake systems for railroad and mass and/or rapid transit operations.

OBJECTS AND SUMMARY OF THE INVENTION

Accordingly, it is an object of this invention to provide a unique electropneumatic controlled air brake equipment for railway vehicles.

A further object of this invention is to provide an improved air brake system which utilizes electronic circuits, electrical relays and an electromagnetic valve to control the air pressure in a brake pipe cut-off valve.

Another object of this invention is to provide a new electrically controlled air brake system which will preserve the given condition of the brake pipe cut-off valve during the loss of electrical power.

Still a further object of this invention is to provide novel air brake apparatus which is operated by electric and pneumatic power to selectively control the fluid pressure of brake pipe cut-off valve.

Still another object of this invention is to provide a novel electropneumatic control arrangement for effectively venting a brake pipe cut-off valve for allowing a relay valve to increase or decrease the pressure in the brake pipe in accordance with the pressure in the equalizing reservoir for a lead locomotive of a train and for alternately pressurizing the brake pipe cut-off valve to prevent the relay valve from increasing or decreasing the pressure in the brake pipe of a trailing or dead locomotive in a train.

Yet a further object of this invention is to provide an electropneumatic air brake control system for railway vehicles, comprising, a pneumatic module portion having a brake pipe cut-off valve connected to a relay valve, a bistable electromagnetic device having a valve portion connected to the brake pipe cut-off valve, an electric pole changing relay connected to a coil of the bistable electromagnetic device, the electric pole changing relay includes a coil connected to a source of d.c. voltage, an electric quick release relay having a coil connected to the source of d.c. voltage, the electric quick release relay having contacts connectable to contacts of the electric pole changing relay, and relay driver means for causing the energization and deenergization of coils of the electric pole changing relay and the electric quick release relay in accordance with the outputs received from a command control circuit and a monitor checking circuit.

Yet another object of this invention is to provide an air brake control system for railway vehicles comprising, a module portion and a relay valve portion, the module portion including a cut-off valve, a bistable electromagnetic device having a valve portion pneumatically connected to the cut-off valve, a pole changing relay electrically connected to a coil of the bistable electromagnetic device, the pole changing relay having a coil connectable to a source of d.c. voltage, a quick release relay having a coil connectable to the source of d.c. voltage, the quick release relay having contacts connectable to contacts of the pole changing relay, and relay driver means supplied by a supplemental power source for causing the coils of the pole changing relay and the quick release relay to be energized and deenergized in accordance with output signals received from a command control circuit and a monitor checking circuit.

An additional object of this invention is to provide a new and improved electropneumatic air brake control arrangement which is economical in cost, effective in operation, reliable in use, durable in service, simple in construction, and quick and easy to install and maintain.

Yet an additional object of this invention is to provide an air brake control system which is a compact, an efficient, a compatible, and an electric emulation for railway vehicles.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIG. 1A is situated on the left side and when FIG. 1B, is situated on the right side of an electropneumatic air brake control system for railway vehicles, in accordance with the present invention.

DETAILED DESCRIPTION OF THE INVENTION

Figure 1A:
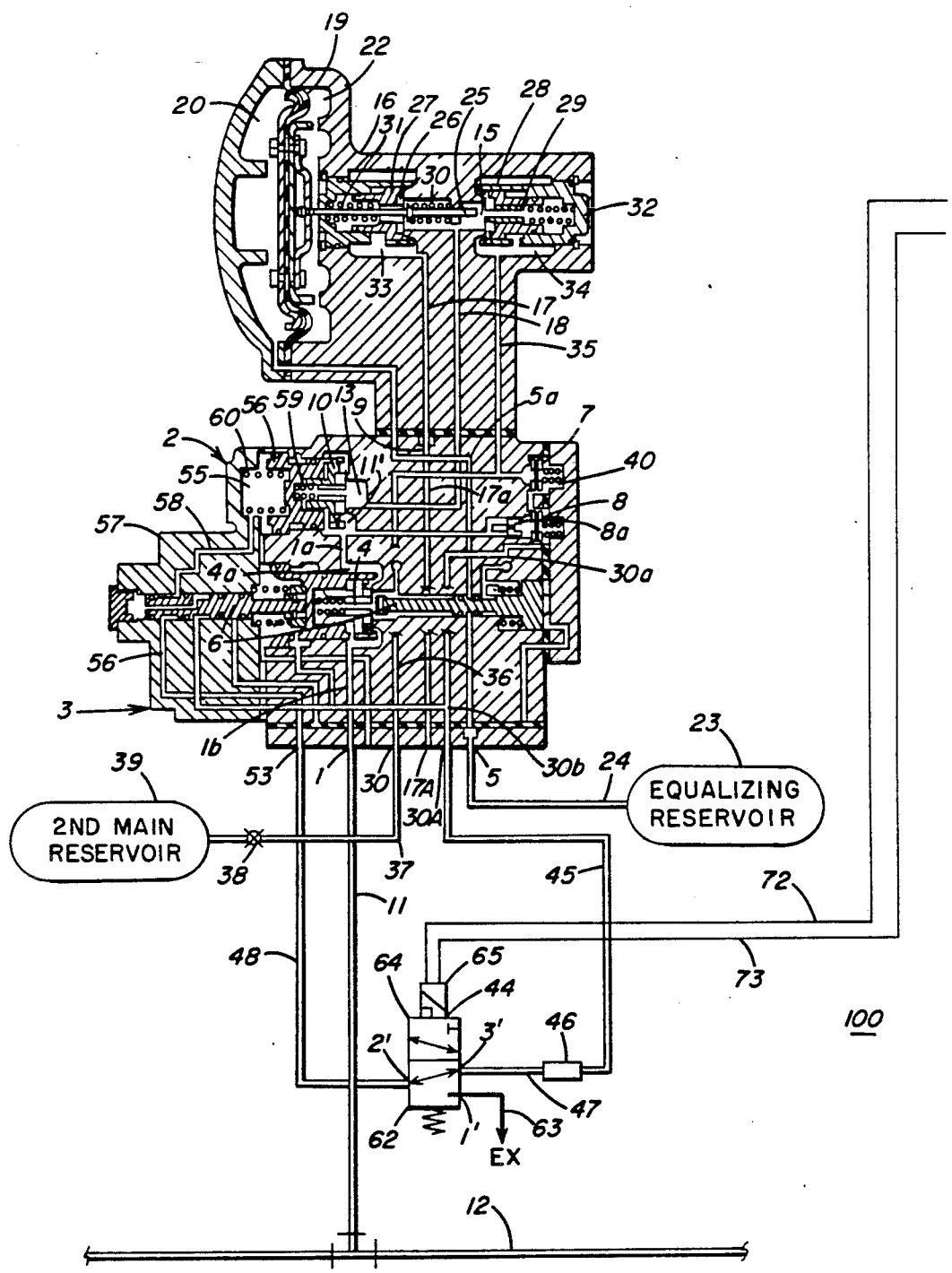
FIGS. 1A and 1B illustrate a diagrammatic schematic view which, when placed in side-by-side relationship, namely, when
Figure 1B:
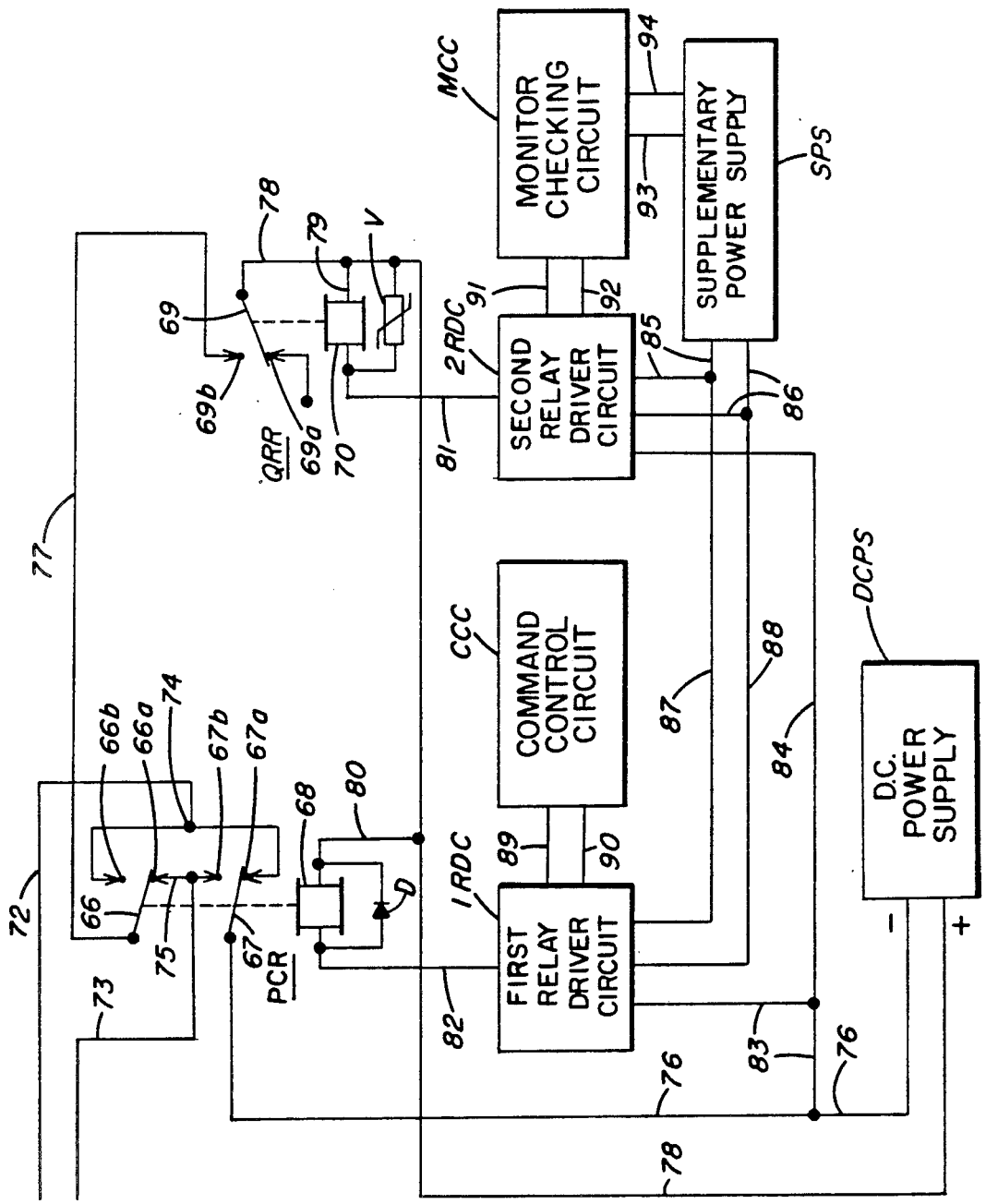

Referring now to the drawings to FIGS. 1A and 1B, there is shown an electropneumatic air brake control system or arrangement generally characterized by numeral 100 for electrically controlling the pneumatic brake pipe cut-off valve 2 which is located in a module portion 3. In addition to the brake pipe cut-off valve 2, the module portion 3 includes a vent valve 4, an emergency valve 6, a pair of check valves 7 and 8, and a flow control choke 9 which are functionally and structurally substantially the same as those of the 30 type of the locomotive brake equipment.

As shown in FIG. 1A, the brake pipe cut-off valve 2 comprises an annular valve member 10 that is disposed in chamber 11' which is constantly in communication with branch pipe 11 and brake pipe 12 via passageway 1a, annular cavity 4a of vent valve 4, passageway 1b, and port 1. This annular valve 10 controls communication between the chamber 11' and a chamber 15 of a relay valve 16 via chamber 13 and a passageway 18.

The relay valve 16 is suitably mounted on module 3 and comprises a diaphragm piston 19 which is subject to opposing fluid pressures in chambers 20 and 22. The pressure in the left-hand chamber 20 is supplied by an equalizing reservoir 23 via pipe 24, port 5 and passageway 5a. The diaphragm piston 19 is arranged to operate through the medium of a coaxially movable operating stem 25 to either effect unseating of a disc-shaped exhaust valve 26 carried by an annular valve member 27 or effect unseating of a disc-shaped supply valve 28 carried by a coaxially arranged annular valve member 29 according to whether the pressure in chamber 20 is less than or exceeds the pressure in chamber 22. In practice, the operating stem 25 is connected to the chamber 22 side of the piston 19 and extends through the valve member 27 and through a chamber 30 and is arranged to abut one end of supply valve member 29. A pair of helical springs 31 and 32 urge the valve members 27 and 29 toward each other for normally concurrently seating valves 26 and 28. The exhaust valve 26 controls communication between chamber 30 and a chamber 33 which is connected to exhaust 17A via upper passageway 17, choke 9 and lower passageway 17a. The supply valve 28 controls communication of chamber 30 with a supply chamber 34 which is always open via passageways 35 and 36, port 30, pipe 37, choke 38 to a second main reservoir 39.

It will be seen that the main reservoir 39 is connected to port 30A via choke 38, pipe 37, port 30, passageway 36, check valve 7, passageway 40, passageways 30b and 30a to supply pressure to line 45 when the pressure in the main reservoir 39 is greater than the pressure in brake pipe 12. Conversely, the pressure is supplied to port 30A by the brake pipe air via the felt strainer 8a and check valve 8 when the main reservoir pressure is below that of brake pipe 12. As shown, the port 30A is connected to the pneumatic valve portion of a bistable permanent magnet latch, electromagnetic two-position, three-way valve device 44. In the position shown in FIG. 1A, the port 30A is connected to port 3' formed in the valve device 44 via pipe 45, filter 46 and pipe 47. The pneumatic portion of valve 44 also includes ports 1' and 2'. As shown, the port 3' is connected to port 2' by the lower portion of the valve 44, and the port 2' is connected to port 53 via a pipe 48. The port 53 is connected to pressure chamber 55 of the brake pipe cut-off valve 2 via passage 56, annular cavity 57 of the emergency valve 6, and passageway 58. The annular valve member 10 is carried by an annular body member that is axially shiftable relative to, and retained within a recess open to chamber 55 and formed in one end of a piston 56. The annular body member and the valve 10 is biased by a helical spring 59 into contact with an annular seat rib encircling chamber 13. A helical biasing spring 60 is disposed within chamber 55 and is in engagement with piston 56.

As previously mentioned, the bistable electromagnetic valve includes a lower portion 62 which interconnects ports 2' and 3' while blocking of exhaust line 63 by port 1' and also includes an upper portion 64 which interconnects ports 2' and 1' while blocking off line 47. It will be seen that electromagnetic valve 44 includes an electric coil or solenoid winding 65 which is sensitive to the voltage polarity connected thereto from a suitable source of d.c. voltage, such as, a d.c. power supply DCPS (see FIG. 1B). When a d.c. voltage of correct polarity and duration is applied to the coil 65, it causes the solenoid plunger to shift the valve to an open or closed position. The plunger is held in the given position by the permanent magnet and will remain in the latched position until a voltage of the opposite polarity and duration is applied to the electric coil 65.

In viewing both FIGS. 1A and 1B, it will be seen that the coil 65 is electrically connected over an appropriate circuit established by suitable contacts of a pole changing relay or pole changer PCR and a quick release relay QRR.

As shown in FIG. 1B, the pole changing relay PCR includes a plurality of movable and stationary contacts 66, 66a, 66b and 67, 67a, 67b and includes an electric coil 68 which is shunted by a snubbing diode D, the purpose of which will be described hereinafter. The movable contacts 66 and 67 are linked together and are jointly moved by the armature of the relay PCR to close normal contacts 66–66a and 67–67a and to open reverse contacts 66–66b and 67–67b or to close reverse contacts 66–66b and 67–67b and to open normal contacts 66–66a and 67–67b. It will be seen that the quick release relay QRR includes a plurality of movable and stationary contacts 69, 69a and 69b and includes an electric coil 70 which is shunted by a snubbing varistor V which will be described hereinafter. The movable contact 69 is linked to the movable armature of the relay QRR to close normal contacts 69–69a and to open reverse contacts 69–69b or to close reverse contacts 69–69b and to open normal contacts 69–69a. It will be appreciated that the electrical state of the coil 68 of the pole changing relay is controlled by a first relay driver circuit 1RDC while the electrical state of the coil 70 of the quick release relay QRR is controlled by a second relay driver circuit 2RDC. Each of the driver circuits may take the form of a solid-state switching stage being powered by a common supplemental power supply SPS. The first relay driver circuit 1RDC is switched on and off by a suitable command control circuit CCC which may be controlled from the control station in the cab of the locomotive. In a similar manner, the second relay driver circuit may be controlled by a suitable monitor checking circuit MCC which may be located in cab control console to monitor the voltage condition of the supplement power supply SPS or the like.

As previously mentioned, the position of the bistable electromagnetic valve 44 is dependent upon the polarity of the voltage applied to coil 65 via leads 72 and 73. As shown, the lead 72 is connected from one end of coil 65 to the normal stationary contact 67a and the reverse stationary contact 66b which are connected together by a jumper wire 74. The lead 73 is connected from the other end of coil 65 to the normal stationary contact 66a and the reverse stationary contact 67b which are connected together by jumper wire 75. As shown, the movable contact 67 is connected to the negative terminal (−) of the d.c. power supply DCPS via lead 76, while the movable contact 66 is connected to the reverse stationary contact 69b of the quick release relay QRR via lead 77. The movable contact 69 of the quick release relay QRR is connected to the positive terminal (+) of the d.c. power supply via lead 78. The lead 78 is also connected to one end of coil 70 via lead 79 and to one end of coil 68 via lead 80. The other end of coil 70 is connected to the output of the second relay driver circuit 2RDC via lead 81 while the other end of coil 68 is connected to the output of the first relay driver circuit via lead 82. As previously mentioned, the diode D is connected in parallel with the coil 68 to cause a delay in the drop-away of the contacts 66 and 67 when the coil 68 is deenergized while the parallel connected varistor V causes a faster drop-away of contact 69 when the coil 70 is deenergized relative to the drop-away of contacts 66 and 67. Like diode D, the varistor V is also effective in spike suppression. The reduction of the magnitude of spikes depends, of course, on the ohmic value of varistor V. As shown, the negative terminal (−) of d.c. power supply DCPS is connected to the output of the first relay driver circuit 1RDC via lead 83 and to the output of the second relay driver circuit 2RDC via leads 83 and 84. As previously noted, the operating voltage is supplied to the second relay driver circuit 2RDC via leads 85 and 86 and is supplied to the first relay driver circuit 1RDC via leads 85, 86, 87 and 88. The output of the command control circuit CCC is conveyed to the input of the first relay driver circuit 1RDC via leads 89 and 90 while the output of the monitor checking circuit MCC is conveyed to the input of the second relay driver circuit 2RDC via leads 91 and 92. The proper operation and voltage level of the supplemental power supply SPS is ascertained and verified by the monitor checking circuit MCC which is suitably connected thereto by leads 93 and 94.

In describing the operation of this invention, it will be assumed that all the components are functioning properly and are in the position as shown in FIGS. 1A and 1B of the drawings. As previously noted, the conditioning of the bistable magnetic latching electromagnet valve 44 is determined by the polarity of the electrical energy or voltage fed to the coil 65. As shown in FIG. 1A, with the coil 68 of the pole changing relay PCR deenergized, its movable contacts 66 and 67 are dropped away or released. The previous voltage that was fed to the coil 65 of the bistable magnet valve 44 was of a polarity such that it resulted in the positioning of the lower valve portion 62 as shown. Thus, this results in the connection of port 3' with port 2'. Let us assume that during the previous electrical state the pole changing relay PCR was deenergized while the quick release relay was energized over a circuit extending from the positive terminal (+) of the d.c. power supply DCPS over leads 78 and 79, through coil 70, over lead 81, through the output of the conductive second relay driver circuit 2RDC over leads 84, 83 and 76 to the negative terminal (−) of the d.c. power supply DCPS. Thus, the quick release release picks up and closes contacts 69 and 69b to establish a circuit from the d.c. power supply DCPS to the coil 65 of the bistable electromagnetic valve 44. That is, an electrical circuit extends from the positive terminal (+) of the d.c. power supply DCPS through lead 78, over closed contacts 69 and 69b, through lead 77, over closed contacts 66 and 66a, over jumper wire 75, through lead 73 to the right end of coil 65 and from the left end of coil 65, through lead 72, through jumper wire 74, over closed contacts 67a and 67, through lead 76 to the negative terminal (−) of the d.c. power supply DCPS. Thus, the right end of coil 65 is positive (+) while the left end of coil 65 is negative (−), which results in the positioning valve portion as shown in which port 3' is connected to port 2'. It will be appreciated that, if the electric energy is intentionally removed by deenergizing relay QRR or inadvertently lost due to a circuit failure, the pneumatic section or portion of valve 44 is retained in the position as shown in FIG. 1A. Thus, the spring chamber 55 of the brake pipe cut-off valve 2 is pressurized by the second main reservoir 39 over a pneumatic circuit through choke 38, pipe 37, port 30, passageway 36, check valves 7, passageway 8, passageway 30a, port 30A, pipe 45, filter 46, pipe 47, ports 3' and 2' of valve portion 62, pipe 48, port 53, passageway 56, annular recess 57 and passageway 58. Alternatively, the port 30A is pressurized via brake pipe 12, branch line 11, port 1, passageway 1b, annular chamber 4a, passageway 1a, felt strainer 8a, and check valve 8. Accordingly, the pressurization of chamber 55 causes the annular valve member 10 to be seated tightly against its seat to effectively inhibit the flow of air from the relay valve 19 to the brake pipe 12 and vice versa. Thus, the remotely located pneumatic brake control equipment is electrically disabled from the cab of the locomotive.

Let us now assume that all the electric and pneumatic apparatus is functioning properly and that it is now desired to permit the pneumatic charging or discharging of the brake pipe 12 via the cut-off valve 2 to allow the active operation of the automatic air brake function. In order to achieve such operation, the remotely located bistable electromagnetic valve 44 must be shifted to its other position in which port 2' is connected to port 1'. The shifting of the bistable electromagnetic valve 44 is initiated from cab control station in the locomotive. The monitor checking circuit MCC senses if the circuit is intact and if the power supply SPS is at the correct level. Thus, the signal on leads 91 and 92 from the monitor circuit MCC energizes the second relay driver circuit 2RDC to cause the energization of relay QRR over the previously traced circuit from the d.c. power supply DCPS to the coil 70. The picking up of relay QRR causes the contacts 69b and 69 to be closed. At the same time, the command control circuit CCC causes an input signal to be conveyed via leads 89 and 90 to the first relay driver circuit 1RDC. The conduction of the first relay driver circuit 1RDC causes the coil 68 of the pole changing relay PCR to be energized by the D.C. power supply DCPS. That is, the right end of coil 68 is connected to the positive terminal (+) of supply DCPS via leads 78 and 80, while the left end of coil 68 is connected to the negative terminal (−) of supply DCPS via lead 82, the output of the first relay driver circuit 1RDC and leads 83 and 76. The energization of the coil 68 of the pole changing relay PCR causes the picking-up of the movable contacts 66 and 67. The pick-up of contacts 66 and 67 causes the closure of stationary contacts 66b and 67b, respectively, to cause the energization of the coil 65 with the reverse polarity of voltage from the d.c. power supply of DCPS. For example, the positive terminal (+) is connected to closed contacts 69, 69a via lead 78 and, in turn, by lead 77 to closed contacts 66, 66b and via jumper wire 74 and lead 72 to the left end of coil 65. The right end of coil 65 is connected to the closed contacts 67b, 67 via lead 72 and jumper wire 75 and, in turn, by lead 76 to the negative terminal (−) of the d.c. power supply DCPS. Thus, with the reverse voltage polarity on coil 65 causes the bistable electromagnetic valve 44 to reverse valve positions in which port 2' is connected to port 1' and, in turn, to exhaust pipe 53 while port 3' leading to pipe 47 is shut off or blocked. As previously noted, the bistable electromagnetic valve 44 is magnetically latched in this position so that even if the coil 65 is deenergized, the valve portion 64 remains in this last activated position. Accordingly, the spring chamber 55 is exhausted to atmosphere via passageway 58, annular cavity 57, passageway 56, port 54, pipe 48, ports 2' and 1' to exhaust pipe 63. Under this condition, the relay valve 19 may supply pressure to the brake pipe 12 from the main reservoir 39 in accordance with the pressure in the equalizing reservoir or the relay valve 19 may vent the brake pipe to atmosphere via passageway 17 and port 17A.

It will be noted that the pole changing relay PCR, the quick release relay QRR as well as the bistable electromagnetic relay 44 are all supplied with electrical voltage from the d.c. power supply DCPS so that a power failure can result in the deenergization of coils 65, 68 and 70, but the valve 44 is magnetically latched and there is no electrical energy to reverse it.

Again, referring to FIGS. 1A and 1B, it will be assumed that the monitor checking circuit is normal so that the quick release relay QRR is picked up by the second relay driver circuit 2RDC. Thus, the contacts 69, 69b are closed and convey given polarity of operating voltage to the contacts of the pole changing relay PCR. Also, it is assumed that the coil 68 is energized so that operating voltage is conveyed to coil 65 of the bistable electromagnetic valve 44 and is of such a polarity that causes its pneumatic valve portion 64 to be positioned such that port 2' is still connected to port 1'. As noted above, this allows the port 53 of the module portion 3 to exhaust to atmosphere and results in the opening of the brake pipe cut-off valve. Let us now assume that the supplemental power supply SPS for relay driver circuits fails which is readily detected by the monitor checking circuit MCC. Thus, the operating power supplied to the coils 68 and 70 by the relay driver circuits 1RDC and 2RDC is interrupted so that coils 68 and 70 are deenergized. It will be appreciated that the snubbing diode D prevents the movable contacts 66 and 67 from immediately dropping away by maintaining current flow through coil 68 so that given polarity of voltage is maintained since the fast drop-away of the movable contact 69 is ensured by the varistor which is connected in parallel with coil 70. That is, the varistor allows faster drop-away of, namely, contact 69 drops way before contacts 66 and 67 drop away. Thus, inadvertent polarity reversal of the voltage appearing across the coil 65 is prevented during a supplemental power supply failure. That is, when the pole change relay eventually drops away and attempts to reverse the voltage polarity fed to the bistable electromagnetic valve 44, no voltage reversal occurs since the power to coil 65 has already been interrupted by the quick release relay QRR. Thus, the latching magnet holds the bistable electromagnetic valve 44 in its present position and port 2' remains connected to port 1' so that the brake pipe cut-off valve 2 remains open. Therefore, under the assumed circumstances, the failure of the supplemental power supply SPS should cause the desired effect of providing a controlled rate of reduction of air pressure in the brake pipe action of the relay valve so that it is possible by virtue of the fact that the communication between the relay valve and brake pipe is retained for pressures above the level established by the biasing spring 60.

Further, it will be appreciated that the unused stationary contact 69a may be employed to arm or control suitable alarms when the monitor circuit MCC senses a failure of the supplemental power supply to immediately warn the appropriate operating personnel on board the locomotive. It will be seen that the pneumatic brake equipment is centralized in a particular location outside of the cab of the locomotive and that the pneumatic piping to the operator's control station is totally eliminated and is replaced by electrical, electronic and electromagnetic apparatus.

It will be appreciated that the single supplemental power source SPS may be replaced by a number of individual power supplies which may be separately monitored by suitable checking circuitry.

Thus, the present invention has been described in such full, clear, concise and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

I claim:

1. An electropneumatic air brake control system for railway vehicles, comprising, a pneumatic module portion having a brake pipe cut-off valve connected to a relay valve, a bistable electromagnetic device having a valve portion connected to said brake pipe cut-off valve, an electric pole changing relay connected to a coil of said bistable electromagnetic device, said electric pole changing relay includes a coil connected to a source of d.c. voltage, an electric quick release relay having a coil connected to said source of d.c. voltage, said electric quick release relay having contacts connectable to contacts of said electric pole changing relay, and relay driver means for causing the energization and deenergization of said coils of said electric pole changing relay and said electric quick release relay in accordance with the outputs received from a command control circuit and a monitor checking circuit.

2. The electropneumatic air brake control system as defined in claim 1, wherein said brake pipe cut-off valve blocks the flow of air to said relay valve when said coil of said bistable electromagnetic device is energized by a first polarity of d.c. voltage from said source.

3. The electropneumatic air brake control system as defined in claim 2, wherein said brake pipe cut-off valve opens the flow of air to said relay valve when said coil of said bistable electromagnetic device is energized by a second polarity of d.c. voltage from said source.

4. The electropneumatic air brake control system as defined in claim 1, wherein said bistable electromagnetic device is a two-position, three-way valve.

5. The electropneumatic air brake control system as defined in claim 1, wherein said coil of said electric pole changing relay is shunted by a snubbing diode.

6. The electropneumatic air brake control system as defined in claim 1, wherein said coil of said quick release relay is shunted by a resistor element.

7. The electropneumatic air brake control system as defined in claim 6, wherein said resistor element is a varistor.

8. The electropneumatic air brake control system as defined in claim 1, wherein said relay driver means is powered by a supplementary power supply.

9. The electropneumatic air brake control system as defined in claim 8, wherein said monitor checking circuit verifies the integrity of said supplementary power supply.

10. The electropneumatic air brake control system as defined in claim 1, wherein said monitor checking circuit causes the relay driver means to deenergize said electric quick release relay to prevent said pole changing relay from inadvertently reversing the polarity of voltage applied to said coil of said bistable electromagnetic device.

11. The electropneumatic air brake control system as defined in claim 1, wherein said valve portion of said bistable electromagnetic device causes said brake pipe cut-off valve to be pressurized by a main reservoir when one polarity of d.c. voltage is applied to said coil of said bistable electromagnetic device and causes said brake pipe cut-off valve to be vented to atmosphere when an opposite polarity of d.c. voltage is applied to said coil of said bistable electromagnetic device.

12. The electropneumatic air brake control system as defined in claim 1, wherein said relay driver means includes a first relay drive circuit which is connected to said coil of said electric pole changing relay.

13. The electropneumatic air brake control system as defined in claim 12, wherein said command control circuit is connected to said first relay driver circuit.

14. The electropneumatic air brake control circuit as defined in claim 12, wherein said relay driver means includes a second relay driver circuit which is connected to said coil of said quick release relay.

15. The electropneumatic air brake control system as defined in claim 14, wherein said monitor checking circuit is connected to said second relay driver circuit.

16. The electropneumatic air brake control system as defined in claim 14, wherein said first and second relay driver circuits are powered by a supplemental power supply.

17. The electropneumatic air brake control system as defined in claim 16, wherein said monitor checking circuit is connected to said supplemental power supply.

18. The electropneumatic air brake control system as defined in claim 16, wherein said coils of said electric pole changing relay and said electric quick release relay are deenergized by the loss of said supplemental power supply.

19. The electropneumatic air brake control system as defined in claim 1, wherein said electrical contacts of said electric quick release relay are contacted in series from said source of d.c. voltage through said contacts of said electric pole changing relay to said coil of said bistable electromagnetic device.

20. An air brake control system for railway vehicles comprising, a module portion and a relay valve portion, said module portion including a cut-off valve, a bistable electromagnetic device having a valve portion pneumatically connected to said cut-off valve, a pole changing relay electrically connected to a coil of said bistable electromagnetic device, said pole changing relay having a coil connectable to a source of d.c. voltage, a quick release relay having a coil connectable to said source of d.c. voltage, said quick release relay having contacts connectable to contacts of said pole changing relay and relay driver means supplied by a supplemental power supply for causing said coils of said pole changing relay and said quick release relay to be energized and deenergized in accordance with output signals received from a command control circuit and a monitor checking circuit.

* * * * *